United States Patent [19]

Haesen et al.

[11] 4,398,420
[45] Aug. 16, 1983

[54] SYSTEM FOR MEASURING THE WALL THICKNESS OF AN OBJECT

[75] Inventors: Wilhelmus M. J. Haesen, Dordrecht; Gerardus M. Keltjens, Grondveld, both of Netherlands

[73] Assignee: B.V. Neratoom, The Hague, Netherlands

[21] Appl. No.: 263,892

[22] Filed: May 15, 1981

[30] Foreign Application Priority Data

May 19, 1980 [NL] Netherlands .................. 8002888

[51] Int. Cl.³ .................................................. G01N 29/00
[52] U.S. Cl. ........................................ 73/597; 73/616
[58] Field of Search ............................ 73/597, 615, 616

[56] References Cited

U.S. PATENT DOCUMENTS

| | | | |
|---|---|---|---|
| 3,220,248 | 11/1965 | Wood | 73/616 |
| 3,354,700 | 11/1967 | Schindler | 73/616 |
| 3,427,868 | 2/1969 | Charbonnier et al. | 73/616 |
| 3,688,565 | 9/1972 | Brech | 73/67.9 |
| 3,808,879 | 5/1974 | Rogers | 73/67.9 |

FOREIGN PATENT DOCUMENTS

| | | |
|---|---|---|
| 2314475 | 1/1977 | France . |
| 6515146 | 6/1966 | Netherlands . |
| 7010802 | 1/1971 | Netherlands . |
| 1323079 | 7/1973 | United Kingdom . |
| 1366050 | 9/1974 | United Kingdom . |

Primary Examiner—Howard A. Birmiel
Attorney, Agent, or Firm—Kenyon & Kenyon

[57] ABSTRACT

The wall thickness of an object is measured on the basis of three consecutive rear wall reflections caused by an ultrasonic wave impinging on the front wall of the object. The time intervals between, on the one hand, the first and second rear wall reflections and, on the other hand, the second and third rear wall reflections are compared. In the event of correspondence of these time intervals, a "good" signal indicative of a true thickness value is produced. The system is adapted for a highly accurate wall thickness measurement, with the feasibility of providing an indication of the percentage of "good" measurements in sequence thereof.

8 Claims, 1 Drawing Figure

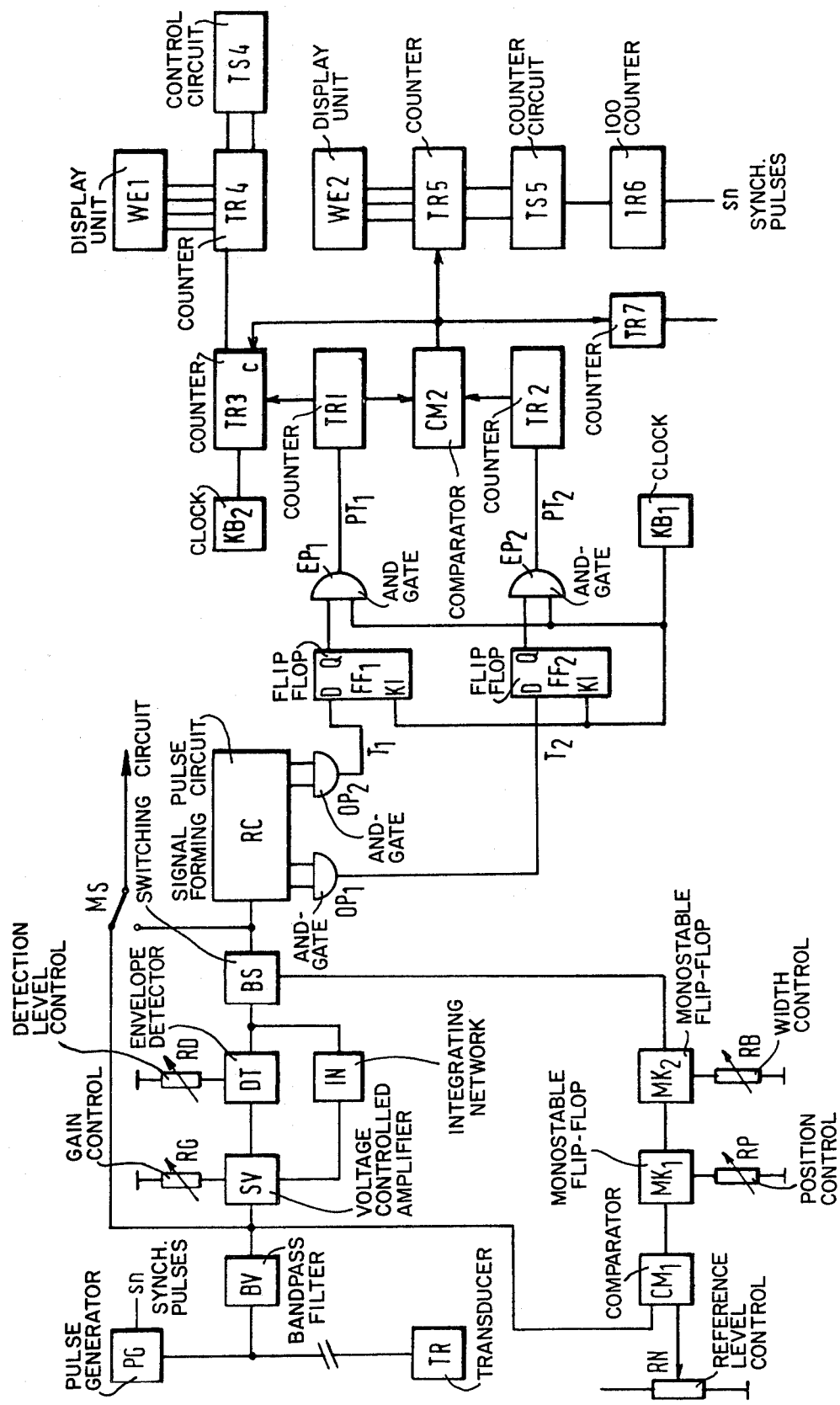

SYSTEM FOR MEASURING THE WALL THICKNESS OF AN OBJECT

The invention relates to a system for measuring the wall thickness of an object, in particular a sheet-like or a tubular member, by means of ultrasonic energy, which system comprises a transducer for transmitting and receiving ultrasonic energy, a transceiver coupled to this transducer and adapted to energize this transducer and to receive and process ultrasonic energy, in particular echo signals, as received by the transducer so that a signal indicative of the wall thickness of the object is derived from a time interval between received echo signals.

Such a system is known from U.S. Pat. No. 4,008,603.

In this prior system, the wall thickness of a tubular member is measured on the basis of a measurement of the time interval between a first echo pulse caused by reflection from the outer surface and a second echo pulse caused by reflection from the inner surface of the object. Such a method entails the drawback that transit-time effects, which are caused by the propagation of the transmitted and reflected ultrasonic waves through and/or between one or more coating layers normally present on the object and through water if the measurement is a so-called immersion measurement, introduce an error into the measuring result, so that no reliable measurement providing a true indication of the wall thickness of the object is possible.

Moreover, measuring errors may be caused as the transducer, at any rate, its active surface, is not positioned exactly parallel to the outer front surface of the object. Such an inaccuracy in the positioning of the measuring transducer causes differences in transit time in the beam of waves (both in a transmitted and in a received beam), as a result whereof a time interval measured between received echo signals is no longer an accurate measure of the real wall thickness of the object.

It is a primary object of the invention to eliminate these drawbacks by providing a measuring system permitting the measurement of wall thicknesses throughout a relevant range of values with a desired accuracy, a certain reliability and reproducibility, in such a manner that the measuring result is presented in a form (either digital or analog) that is an absolute measure of the wall thickness of the object. The system may be used for immersion measurements as well as contact measurements and does not involve the aforesaid transit-time effects.

The invention is based on the idea that, on the one hand, the effect of one or more coating layers present on the object and of a path of water, if immersion measurements are concerned, on the measuring result is eliminated if the measurement is based exclusively on echo signals caused by reflections from the rearmost boundary of the wall to be measured (seen in the direction in which the transmitted ultrasonic waves propagate towards the object), and that, on the other hand, a correct measurement requires the time intervals between successive ones of such echo signals to be equal to each other.

A system according to the invention is therefore characterized by a discriminator circuit adapted to select three successive echo signals caused by reflections from the rearmost boundary of the respective wall of the object, as seen in the direction in which a transmitted signal propagates towards the object, from among a group of received signals as produced after the transmission of a signal burst of ultrasonic energy; a convertor circuit adapted to convert the time intevals between such three successive echo signals into a first pulse train indicative of the time interval between the first and the second echo signal and a second pulse train indicative of the time interval between the second and the third echo signal; a comparator for comparing such a first pulse train to such a second pulse train; and a processor circuit which, when the comparison preformed by the comparator shows correspondence of the pulse trains, forms a digital signal representative of the thickness of the respective wall from one of the pulse trains.

An important technical advantage of a system according to the invention is that measuring errors caused by insufficiently accurately positioning the transducer relative to the object to be measured are actually eliminated. The system according to the invention is immune to such measuring errors also in a situation in which a succession of measurements is performed in which the transducer is moved along the object.

In a thus-arranged system according to the invention, at all times a correct presentation, for example in digital form, of the measuring result is achieved without sources of errors (spurious signals) or laminations, by which term protective and/or oxide layers are meant, affecting the measurement. Some defects in the object are detected, however, and are presented, for example, as reductions of the wall thickness.

A measurement throughout the relevant range of thickness values with a desired degree of accuracy, for example an accuracy of ±0.01 mm, requires a number of hundred clock pulses per millimeter wall thickness.

Taking into account a given propagation velocity of ultrasonic waves in the material of the object to be measured, normally steel, as well as the maximum thickness to be measured with the desired accuracy, hence a clock pulse rate in the order of 300 mega cycles would be required.

For reasons of design, it is not attractive to arrange the system for operation at such a high clock frequency. In order to permit measurement at an n times lower clock frequency, for example $n=10$, with the desired accuracy of e.g. ±0.01 mm, for steel, the system according to the invention is further characterized in that the transceiver includes a known per se pulse generator for producing pulses at a preselected repetition rate, the transducer being responsive to these pulses to transmit a corresponding series of signal bursts of ultrasonic energy; and that the processor circuit is further arranged to statistically average a preselected number, for example hundred, of the pulse trains which are each the result of a transmitted signal burst and are each a measure of the wall thickness of the object to be measured.

In a thus-arranged system, by reducing the clock frequency, for example by a factor 10, the accuracy of the measurement is likewise reduced by a factor 10. However, by statistically averaging, in this embodiment, a hundred measuring values, the measuring accuracy is increased by a factor $\sqrt{100}=10$ relative to that of a single measurement.

In order to achieve the desired measuring accuracy in the averaging procedure, taking into account the circumstance that the phases of the selected echo signals are "random" with respect to the phase of the clock pulses used, the system according to the invention is further characterized in that the convertor circuit includes a first and a second synchronisation gate circuit, each of these synchronisation gate circuits being controlled by a control circuit connected to a first input thereof to pass each time, in synchronism with clock pulses applied thereto, a number of these clock pulses, which number is defined by the time interval between a pair of successive selected echo pulses.

A structurally simple embodiment of the invention is characterized by a measuring value counter responsive to each output signal produced by the comparator in the event of correspondence of the compared pulse trains, to assume a counting position indicative of the wall thickness of the object to be measured, which measuring value counter can be read out by auxiliary clock pulses applied thereto so that each counting position provides a corresponding series of measuring value pulses; and that a display circuit is arranged to sum such series of measuring value pulses and to divide the summing result by a factor corresponding to a preselected number of these series.

In such an embodiment, the summing of the measuring value pulses and the division of the summing result by a factor corresponding to the number of auxiliary clock pulse series applied thereto can be realized in a simple manner by means of a single counter in which the last two decimal places of the summing result are omitted.

Furthermore, a system according to the invention is characterized in that the discriminator circuit includes a controllable switching circuit controlled by a control circuit to pass an input signal applied thereto for the duration of a control signal, and a detector circuit for producing this input signal in the form of substantially mutually equal unipolar signal pulses, the control circuit being responsive to a reference signal that is a measure of the echo signal received first after a transmitted signal burst to produce a control pulse as a reference for the control signal.

In order to simplify the selection of the desired echo signals, a system according to the invention is characterized in that this control circuit includes facilities as a result whereof the time position and time length of the control signal are optionally adjustable.

The invention will be described in greater detail hereinafter with reference to an embodiment shown in the accompanying drawing.

The drawing shows a block diagram of an embodiment of a measuring system according to the invention. Such a measuring system employs a piezoelectric transducer TR for transmitting one or more pulses of ultrasonic energy and for receiving ultrasonic waves caused by such a transmission. Electric pulses serving this purpose, which pulses are produced by a pulse generator PG of known per se design, are converted by the transducer in corresponding longitudinal mechanical vibrations propagating in the material to be examined, normally metal walls coated with one or more protective layers. These mechanical vibrations can be transferred to and in the object to be measured, for example the wall of a tube or a sheet-like member, either via a coupling medium between the transducer and the object (contact measurement) or via a suitable transfer medium, normally water (immersion measurement). The echo signals caused by reflections are again converted by this transducer into corresponding electric vibrations. In a measuring system according to the invention the time interval between a pair of successive echo signals as produced by reflections from the rearmost boundary (seen in the direction in which an ultrasonic wave transmitted by the transducer propagates towards the object) of the wall to be measured, in other words the rear wall echos, is used as a direct measure of the wall thickness to be measured. In order to check the measuring result, use is made each time of three successive ones of such rear wall echos, the time interval between the first and the second rear wall echo being compared to the time interval between the second and the third rear wall echo. Only if these two time intevals are equal to each other is such a measured time interval accepted for further processing.

Due to such an organisation of the measuring procedure, transittime effects as caused by coating layers on the object to be measured and, in the event of immersion measurements, by the path of water are eliminated, while only proper measuring results, in other words measuring results that are not distorted by spurious effects, are processed and displayed.

As it is desired to perform the measurement of the wall thickness with optimal accuracy, the transducer used in the measuring system should have a relatively high attenuation as well as a relatively high natural frequency, for example between 5 and 15 mega cycles. On account of the high attenuation, the transducer should be driven by a relatively high voltage, 250 V nominal, while the rise time of such a drive pulse should not exceed 20 nanoseconds. The pulse generator PG used for this purpose is of known per se arrangement and produces pulses at a repetition rate of maximally 15 kilo cycles.

Generally speaking, the measuring system is composed of an analog section functioning as a discriminator, which section is adapted to select the rear wall echo signals desired for the wall thickness measurement, and a digital section adapted to digitalize the echo signals selected by the discriminator section and to further process these echo signals into a form suitable for a digital presentation of the measuring results.

The discriminator circuit comprises an amplifier BV operative as a bandpass filter, the passband of which amplifier is defined by the natural frequency of the transducer. On account of the operation of this amplifier as a bandpass filter, undesired signals are initially filtered out. The thus-filtered and amplified signal is applied to a voltage-controlled amplifier SV. The gain introduced by this amplifier is optionally adjustable, which is schematically indicated in the drawing by the adjustor RG. The output signal of this amplifier SV is applied to an envelope detector DT having an optionally adjustable detection level, which is schematically indicated in the drawing by the adjustor RD. Signals having a level lower than the detection level, such as noise signals, may be eliminated in this manner.

Due to the fact that successive rear wall echo signals are attenuated, substantially identical signals which differ from each other in so far as their amplitudes are concerned, the use of a fixed detection level may lead to phase errors, resulting in the introduction of errors into the time intervals that should be a measure of the wall thickness to be measured. In order to eliminate or at any rate substantially reduce such phase errors and measuring errors resulting therefrom, the voltage-controlled amplifier SV and the detector DT are included in a control loop by connecting the output of the detector via an integrating network IN to the control input of the amplifier SV. The time constant of this integrating network is determinative of the velocity of the automatic control, as a result whereof the gain instantaneously introduced by the amplifier SV is controlled in dependence upon the output signal of the detector, to the effect that this gain is increased and reduced respectively as the rear wall echo signal to be detected is greater and smaller respectively. Self-evidently, this time constant of the integrating network should be adjusted to the time interval between successive rear wall echoes. As such a time interval is not always known, an average time constant should be selected in such a manner that the rear wall echos remain within a given amplitude range in order to thus reduce as much as possible the phase errors and measuring errors introduced thereby.

In an alternative embodiment for reducing the aforesaid phase errors, use may be made of a control circuit adapted to vary the detection level in dependence upon the variation in the (higher degree of) attenuation experienced by successive rear wall echo signals. In other words, the control is such that the amplitude-responsive variation in the detection level and the variation in the envelope of the peaks of the maximum amplitudes of successive echo signals are similar. This can be realized by connecting a comparator having a variable reference signal to the output of the switching circuit BS. This reference signal is controlled in the manner described above.

In order to be able to select three rear wall echos after each transmitted signal burst, a measuring system according to the present invention employs a controllable switching circuit BS. A signal applied from the output of the detector to this switching circuit is periodically passed thereby under the control of a periodically occurring control signal operating as a window. The beginning of this window is related to the first echo signal received after a transmitted signal burst, which echo signal is the result of the transmitted wave reflecting from the "outermost" boundary of the wall to be measured. The position as well as the magnitude of this control signal are determined and may be varied by means of two monostable flip-flop circuits MK1 and MK2 connected in cascade. The position of this control signal relative to the aforesaid first echo may be adjusted by means of the adjustor RP and the width of this control signal may be optionally adjusted by means of the adjustor RB. A comparator CM1 is provided in order to relate the beginning of this control signal to a reference level that is optionally adjustable by means of the adjustor RN and that is adjusted in accordance with the amplitude of the aforesaid first echo. In this manner it can be achieved that after each signal burst transmitted to the object to be measured, the three desired rear wall echos can be selected, as the aforesaid control signal for the controllable switching circuit is present only during an interval within which these three desired rear wall echos occur. By manually operating the adjustors RP and RB, an operator can select by means of an oscilloscope the desired three rear wall echos required for a measurement. By means of a mode switch MS connectable to an oscilloscope, either the received video signal or the signal passed by the switching device may be visualized.

The output signals of the controllable switching device can be shaped by means of a comparator (not shown) having a fixed detection level into pulses suitable for further processing. A buffer stage may be included in the connection between the output of the amplifier BV and the upper contact of the mode switch MS in order to avoid feedback.

Each three pulses thus-formed from the output signal of the controllable switching circuit BS, which are representative of three successive rear wall echos as produced after the transmission of a signal burst, are converted into a pair of spatially separated time signals T1 and T2, the signal T1 representing the time interval between the leading edges of the first and the second rear wall echo and the signal T2 representing the time interval between the leading edges of the second and the third rear wall echo. The circuit used for forming the signal pulses T1 and T2 comprises a configuration of four flip-flops connected in line, each flip-flop being of the type in which the signal condition at the Q output becomes equal to the signal condition present at the D input in response to the leading edge of a clock pulse applied thereto, which configuration is schematically indicated by RC, and two AND-gates OP1 and OP2, in which the inputs of the gate OP1 are connected to the D input and the $\overline{Q}$ output respectively of the penultimate flip-flop, while the inputs of the gate OP2 are connected to the D input and the $\overline{Q}$ output respectively of the ultimate flip-flop.

The widths of the time signal pulses T1 and T2 as produced by the combination of the flip-flop configuration RC and the gates OP1 and OP2 is a measure of the wall thickness of the object to be measured. In order to convert these time intervals into a form suitable for digital presentation, the magnitude of such a time interval is measured by counting the number of clock pulses occurring within such a time interval. In a digital system of the present type it is very important that the correctness of the measurements is checked. Measuring errors may result from different causes, such as mains voltage fluctuations, detection errors, false echos, laminations and other irregularities in the material of the object. A measurement is only considered to be correct if it has appeared that two successive time signal pulses, such as T1 and T2, are identical to each other within a certain degree of accuracy (depending on the comparison performed).

When the wall thickness of an object is measured in the aforesaid manner by counting clock pulses occurring within a time interval that is a measure of this wall thickness, the following is important too. Assuming that a wall thickness of, for example, 40 mm has to be measured and the propagation velocity of sonic energy in the material of the wall of the object is 5900 m/sec, a time signal pulse T1 will (taking into account the forward and return path in the propagation of the sonic waves) be 13.6 microseconds. If the wall thickness in question has to be measured with an accuracy of ±0.01 mm, 4000 clock pulses should occur within a time interval of 13.6 microseconds, which boils down to a clock pulse frequency of 4000/13.6=294 mega cycles.

For reasons of design, it is undesired to use such high clock pulse frequencies. In order to avoid this drawback and to be able to use a clock pulse frequency which is a factor n smaller (for example n=10), while nevertheless the ultimate accuracy of the measurement has the desired value, for example 0.01 mm, in a measuring system according to the present invention $n^2$ measuring values (i.e. 100 in the present example), as derived from a time signal pulse such as T1, are statistically averaged, as a result whereof an ultimate accuracy is achieved which is $\sqrt{100}$ greater than that of a single measurement, the accuracy of which is a factor n smaller, in the present example ±0.1 mm, as the clock pulse frequency is selected a factor n smaller.

It should further be taken into account in this connection that the phases of the time signal pulses T1 and T2 are random with respect to those of the clock pulses, so that some form of synchronisation is required. In the system according to the invention, such a synchronisation is achieved by means of two flip-flops FF1 and FF2 (which are each of the type in which in response to a leading edge of a clock signal applied from the clock pulse source KB1 to the clock input, the signal condition at the Q output becomes equal to the signal condition then present at the D input) and an AND-gate associated with each one of these flip-flops, such as the gates EP1 and EP2.

By means of such an arrangement it is achieved that, if for example a number of 100 time signal pulses T1 is averaged, in spite of the random phases of these time signal pulses with respect to those of the clock signal pulses as originating from the source KB1, an ultimate measuring value is achieved which is indicative of the wall thickness of the object with the required degree of accuracy. In particular, each one of the time signal pulses T1 and T2 respectively is converted into a pulse train PT1 and PT2 respectively at the output of the gate EP1 and EP2 respectively, the number of clock pulses present in such a pulse train being a measure of the width of the time signal pulse T1 and T2 respectively. Consequently, each of such pulse trains is representative of one measurement.

For each measurement the pulse trains PT1 and PT2 formed are applied to an associated counter TR1 and TR2 respectively, the counting values formed in these two counters, which values are each representative of the number of clock pulses present in the respective train applied thereto, being compared to each other by a comparator CM2. This comparator produces an accept signal if these two counting values appear equal to each other with an acceptable degree of accuracy. This accept signal causes the counting position of a counter TR3 to be increased by the counting value present in the counter TR1 at the instant of the accept signal. The resultant counter position of this counter TR3 is subsequently counted down to zero by the action and in the rhythm of clock pulses originating from a clock pulse source KB2, as a result whereof a number of pulses equal to the counter position in question is produced at the output of this counter.

In this manner, the contents of the counter TR3 are transferred by the action of the clock pulse source KB2 to a measuring value counter TR4, which counter TR4 is operative as a summer-divider of the pulses applied thereto, so that actually this counter TR4 performs the averaging of the respective number of measurements, in the present example 100. This can be simply realized by ignoring the last two digits of the result of the summing performed in the counter TR4, so that if this result includes, for example, six digits, only the four most significant digits are displayed. This is schematically shown in the drawing by means of the four lines between this counter TR4 and a display unit WE1 for displaying the measured wall thickness in digital form and with the desired degree of accuracy (in the present example ±0.01 mm).

Self-evidently, provisions should be made (which provisions, however, fall outside the scope of the present invention) to reset the counters TR1 and TR2 to zero each time after the respective pulse trains PT1 and PT2 have been applied thereto and have been compared to each other, and to reset the counter TR4 to zero each time after the desired number of measurements, for example 100, has been performed. The accept signal as produced by the comparator CM2 is also operative to increase the contents of a counter TR5, so that in this counter a counting value is produced that is indicative of the number of accepted, i.e. "good", measurements. This counter TR5 is controlled so that the number of good measurements is included therein over a time interval corresponding to a number of 100 measurements (irrespective of the fact whether these measurements are accepted or rejected), which control can be derived from synchronisation pulses sn as produced by the pulse generator PG. Thus the contents of this counter TR5 provide a percentage indication of the number of good measurements, which number can be displayed by a display unit WE2. The actuation and the resetting to zero of the counter TR5 is controlled by the control circuit TS5 which in turn is operative in dependence upon a 100 counter TR6 actuated by the synchronisation pulses sn.

The aforesaid control of the counter TR4 is achieved by means of the associated control circuit TS4. This control circuit TS4 operates in dependence upon the counter position of a separate counter TR7 counting the number of good measurements, which is required to control the averaging procedure performed by the counter TR4.

If desired, by means of thumb-wheel switches and comparators (not shown) a preset threshold value that is indicative of an acceptable minimum wall thickness can be compared to the measuring results, an alarm signal being produced if the measured wall thickness is less than the threshold value.

Moreover, it is possible to convert the measuring signal produced in digital form into a corresponding analog signal by means of a digital-to-analog convertor.

We claim:

1. Apparatus for measuring wall thickness of an object by ultrasonic energy, the apparatus including a transducer for transmitting ultrasonic energy into a front wall of an object and receiving echo signals from the object, a transceiver coupled to the transducer for energizing the transducer to transmit periodic pulses of ultrasonic energy and for processing the echo signals received by the transducer to derive a signal indicative of the wall thickness of the object from a time interval between received echo signals, wherein the improvement comprises:

a discriminator circuit adapted to select a set of three successive echo signals as caued by reflections from a rear wall of the object from among a group of received echo signals received in response to each transmitted pulse of ultrasonic energy;

a converter circuit coupled to the discriminator circuit for converting the time intervals between each set of three successive echo signals into a first pulse train indicative of the time interval between the first and second echo signal of the set and a second pulse train indicative of the time interval between the second and third echo signal of the set, said converter circuit including level control circuitry adapted to maintain the relative detection point of each echo signal of each set substantially the same;

a comparator coupled to the output of the converter circuit for comparing each first pulse train with the corresponding second pulse train; and a processor circuit for producing a signal which effectively contributes to a measuring result representative of the wall thickness of the object only when the respective first and second pulse trains are substantially matched to each other.

2. Apparatus according to claim 1 wherein the converter circuit comprises first and second synchronization gate circuits, each synchronization gate circuit having a first input for receiving an enabling signal representative of the current time interval length between respectively the first and second and the second and third rear wall echo pulses of each set of three consecutive echo pulses, a second input for receiving clock pulses, and an output such that each of said gate circuits is enabled for the duration of the respective enabling signal for producing at its output a whole number of output pulses corresponding to the number of clock pulses occurring during the existence of the respective enabling signal.

3. Apparatus according to claim 1 or 2 wherein said processor circuit comprises means for statistically averaging a preselected plurality of said signals which effectively contribute to a measuring result.

4. Apparatus according to claim 3 wherein said processor circuit comprises a measuring value counter coupled to the output of the comparator, said measuring value counter being incremented by an amount representing the current time interval length between two consecutive rear wall echo pulses whenever the first and second pulse trains of a set are substantially matched and an auxiliary clock coupled to the measuring value counter for reading out each count stored in the measuring value counter to provide a sequence of measuring value pulses corresponding to each stored count; and said means for statistically averaging a preselected plurality of said signals which effectively contribute to a measuring result comprises a display circuit connected to the measuring value counter for accumulating a preselected plurality of said sequences of measuring value pulses and for dividing the accumulated result by a factor equal to said preselected plurality.

5. Apparatus according to claim 1 wherein said processor circuit comprises a measuring quality value counter coupled to said comparator for counting a number of output signals produced by the comparator whenever there is a substantial match between the first pulse train and the second pulse train of a set, and a control circuit connected to said measuring quality value counter for having said counter count said output signals over a time interval corresponding to a preselected number of consecutive ultrasonic energy pulses transmitted by the transducer.

6. Apparatus according to claim 1 wherein the discriminator circuit comprises:
   a control circuit responsive to a reference signal that is a measure of the echo signal received first after transmission of an ultrasonic energy pulse from the transducer for producing a control pulse as a reference for a control signal;
   a controllable switching circuit controlled by said control circuit for passing an input signal for the duration of said control signal; and
   a detector circuit coupled between the transducer and the controllable switching circuit for producing said input signal in the form of substantially mutually equal signal pulses.

7. Apparatus according to claim 6 wherein the control circuit further comprises means for adjusting the timing of said control signal with respect to said control pulse and means for adjusting the duration of said control signal.

8. Apparatus according to claim 1 wherein said level control circuitry comprises a regulator circuit for producing a variable reference signal in response to the variation in amplitude of the successive echo signals and a comparator for comparing successive echo signals to said variable reference signal.

* * * * *

UNITED STATES PATENT AND TRADEMARK OFFICE
CERTIFICATE OF CORRECTION

PATENT NO. : 4,398,420
DATED : August 16, 1983
INVENTOR(S) : Wilhelmus M.J. Haesen, et al.

It is certified that error appears in the above—identified patent and that said Letters Patent is hereby corrected as shown below:

Delete "Title" and insert --Ultrasonic Apparatus for Measuring Wall Thickness--.

Signed and Sealed this

Thirteenth Day of December 1983

[SEAL]

Attest:

GERALD J. MOSSINGHOFF

Attesting Officer          Commissioner of Patents and Trademarks